July 7, 1925.
D. J. ANGUS
1,545,078
RECORDING METER
Filed Jan. 19, 1925
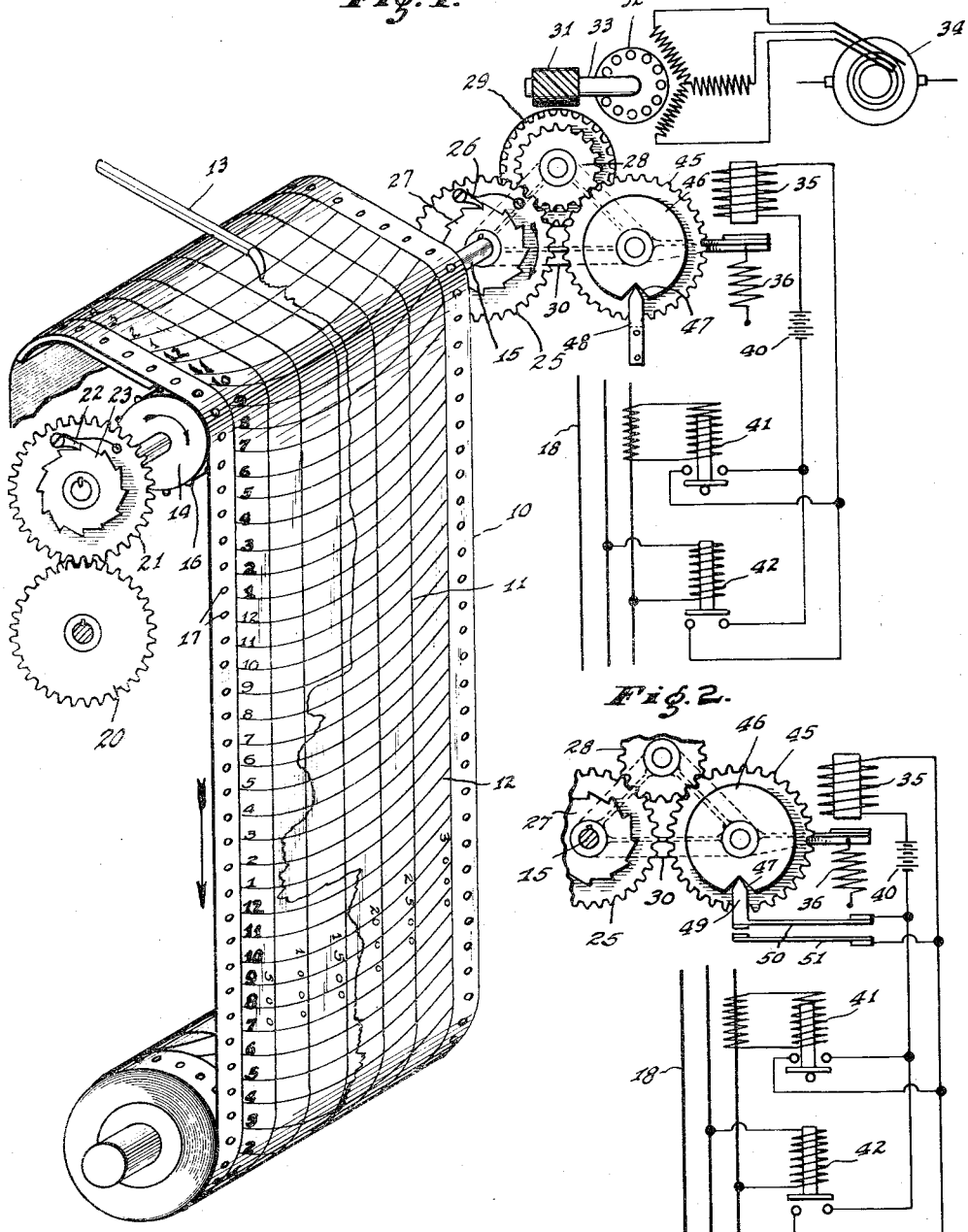
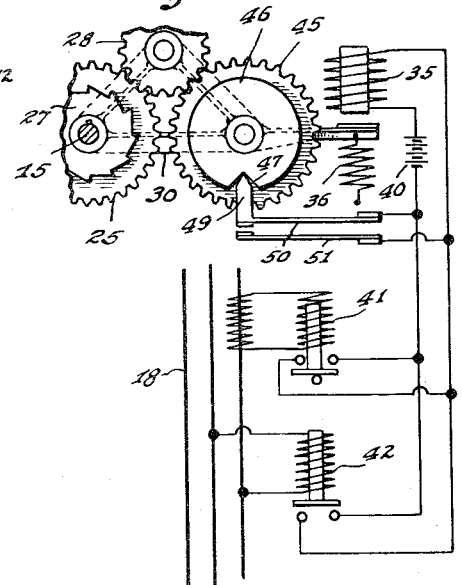
INVENTOR.
DONALD J. ANGUS,
BY
ATTORNEY.

Patented July 7, 1925.

1,545,078

UNITED STATES PATENT OFFICE.

DONALD J. ANGUS, OF INDIANAPOLIS, INDIANA.

RECORDING METER.

Application filed January 19, 1925. Serial No. 3,265.

*To all whom it may concern:*

Be it known that I, DONALD J. ANGUS, a citizen of the United States, residing at Indianapolis, in the county of Marion and State of Indiana, have invented a new and useful Recording Meter, of which the following is a specification.

In the ordinary operation of graphic meters, an entirely adequate record may be obtained on a slow-moving chart; for the variations from second to second, or even from minute to minute, are ordinarily of comparatively slight import.

In emergencies, however, especially in the larger electric supply systems in which many stations and generators are interconnected, what happens from second to second, or even in fractions of seconds, becomes extremely important; and the things which happen in the beginning of the emergency, as during the first second or two, are often of the greatest importance. The detail of such happenings which occur within a few seconds is completely lost in the record on the ordinary slow-moving chart; and it is information regarding such detail that is frequently most desired.

It is the object of my present invention to provide a meter in which the chart ordinarily operates at any desired slow speed; but which upon the occurrence of an emergency starts at once to operate at a predetermined higher speed, to give in minute detail the record of what occurs during the emergency, and especially during the early part of the emergency. It is my object to effect this change from low speed to high speed in minimum time, so that the chart will be moving at the higher speed very early in the first second of the emergency.

It is a further object of this invention to continue the operation of the chart at the higher speed beyond the expiration of the emergency for a period sufficiently long to produce a predetermined total high-speed travel-distance; such as a total distance equal to what is required for some integral number of minutes, hours, or days of operation at the lower speed, so that at the expiration of the high-speed travel the chart will resume its operation at the low speed at the same hour and minute on the chart at which it started its high-speed operation.

The accompanying drawing illustrates my invention: Fig. 1 is a semi-diagrammatic view of a meter chart with both the normal driving mechanism and an emergency driving mechanism arranged in accordance with a preferred embodiment of my invention, as applied to an electrical distribution system; and Fig. 2 is a fragmentary diagrammatic view showing a modification.

The chart 10 may be the chart of any graphic meter; and usually has longitudinal lines 11 indicating values of the quantity the meter measures, and transverse lines 12, usually arcs, indicating time. The record is made by moving the chart beneath a pen 13, which makes a graph on the chart. The chart 10 is shown as suitably driven by a roller 14 on a shaft 15; which roller has radially projecting pins 16 for meshing with holes 17 along the edges of the chart. The details of how the chart is driven from the shaft 15, and of how the pen 13 is operated under the control of the conditions to which the meter is responsive, may be anything desired, depending upon the type of meter used, and the thing which the meter is to record. As shown, the meter is assumed to be an electric meter, associated in any suitable way with a supply circuit 18; but it is not necessary to my invention that the meter be an electric meter, or that it be associated in any particular way with the supply circuit 18 if it is an electric meter.

The shaft 15, which is the driving shaft for the chart 10, has two driving mechanisms. One of these is the normal driving mechanism, for operating the chart 10 at a low speed; and may consist of a conventional clock-work mechanism, indicated by a gear 20, driving a gear 21 loose on the shaft 15 but associated with said shaft by an overrunning clutch, such as a pawl 22 and ratchet wheel 23. The nature of this normal driving mechanism is immaterial, and the clock-work mechanism is mentioned and indicated only because it is a simple and ordinary driving mechanism for meter charts.

The other driving mechanism for the chart-moving shaft 15 is the emergency driving mechanism, for driving the shaft 10 at high speed. For this, in the form in which I have illustrated my invention, the shaft 15 has loose thereon a gear 25; which, like the gear 21, is connectible to the shaft 15 by a suitable overrunning clutch, shown as a pawl 26 engaging a ratchet wheel 27 fixed on said shaft. The gear 25 meshes with a pinion 28, which is fixed to a worm wheel 29 to rotate therewith. The pinion 28 and worm wheel 29 are carried by a frame 30 pivoted on the shaft 15, so that such frame and the parts carried thereby may be moved about the shaft 15 as a pivot without disturbing the meshing of the gear 25 with the pinion 28. The gear 25, pinion 28, and worm wheel 29 are normally stationary. The worm wheel 29 is one member of a normally open clutch, the other member of which is a constantly rotating worm 31. The worm 31 is operated at constant speed, continuously, so that it is always ready to start into action in moving the chart 10, without the necessity for any period of acceleration. While various mechanisms may be used for obtaining this continuous constant operation of the clutch-member or worm 31, I desirably obtain it by a continuously running motor 32, the shaft 33 of which carries the worm 31. Desirably the motor 32 for operating the worm 31 is supplied from a source of current separate from the main supply circuit 18, as from a special generator 34; so that such motor 32 will not be affected by what happens to the main supply circuit 18.

The two clutch-members 29 and 31, as already stated, are normally out of mesh with each other; so that while the clutch-member 31 is continuously rotated at constant speed, the clutch-member 29 is normally stationary. These two clutch-members 29 and 31 are moved into mesh upon the occurrence of an emergency; as by an electromagnet 35 acting on the frame 30 to tilt it and the parts it carries in a counter-clockwise direction to lift the worm gear or clutch-member 29 into engagement with the worm or clutch-member 31. The frame 30 is normally spring-pressed in a clockwise direction, as by a spring 36, to de-mesh the two clutch-members 29 and 31; but when the electromagnet 35 is energized, it moves the frame 30 against the spring 36 to produce meshing of the two clutch-members. Upon such meshing of the two clutch-members 29 and 31, the worm wheel 29, pinion 28, and gear 25 are started into operation; and the movement of the gear 25 is faster than that of the gear 21, so that the overrunning clutch 26—27 takes hold and drives the shaft 15 at the desired higher speed, as permitted by the overrunning clutch 22—23 of the normal driving mechanism.

The electromagnet 35 may be energized in response to any desired conditions. I shall not attempt to enumerate the various conditions to which it may respond. In the illustration shown, it is supplied from a suitable source of current 40, and is controlled by an overload relay 41 and a no-voltage relay 42 suitably associated with the main supply circuit 18 to respond to current and voltage conditions therein. With these relays, the electromagnet 35 is energized to cause the high-speed operation of the chart 10 upon the occurrence of an overload on the circuit 18 or upon failure of the voltage of such circuit.

In addition to means for causing the high-speed driving mechanism to drive the chart during the occurrence of an emergency, I provide means for continuing such high-speed driving of the chart after the expiration of the emergency, until the total time is sufficient to produce a high-speed movement of the chart 10 through a predetermined distance, desirably equal to an integral number of minutes, hours, or days of slow movement. This may be done in a number of ways, of which I show two by way of illustration. In Fig. 1 I have illustrated mechanical means for doing this; and in Fig. 2 I have illustrated electrical means for doing it.

In both of these illustrations, the frame 30 carries a gear 45 which meshes with the pinion 28, and which is therefore tilted when the frame is tilted. The gear 45 has on its shaft a cam 46, which in the simpler form of my invention is a circular cam with a single peripheral notch 47.

In the mechanical arrangement shown in Fig. 1, the cam 46 co-operates with a fixed stop 48, which is seated in such notch 47 when the frame 30 is in its clockwise position and the clutch-members 29 and 31 are de-meshed. When the frame 30 is tilted counter-clockwise by the electromagnet 35, and the clutch-members 29 and 31 are meshed, the starting into rotation of the pinion 28 causes a similar starting of the gear 45 and cam 46, which immediately moves the notch 47 out of registry with the stop 48. Such registry does not occur again until the cam 46 has made a complete rotation; which complete rotation may correspond to any desired distance of movement of the chart 10, such as that which is required for twenty-four hours at slow speed. When the end of the emergency occurs, and the electromagnet 35 is therefore de-energized, the frame 30 is prevented from tilting clockwise to de-mesh the clutch-members 29 and 31, because the circular periphery of the cam 46 is riding on the stop 48 to prevent such tilting; so that such de-meshing does not occur until the notch 47 has again come into registry with the stop 48.

In the electrical arrangement shown in Fig. 2, the cam 46 co-operates with a cam-button 49, which is seated in the notch 47 when the frame 30 is in its clockwise position and the clutch-members 29 and 31 are de-meshed. The cam button 49 is on one of two normally separated contact members 50 and 51, connected in parallel with the circuit-closing contacts of the relays 41 and 42 so that they also serve when engaged to close the circuit of the electromagnet 35. When the frame 30 is tilted counter-clockwise by the electromagnet 35, upon the energization of the latter by the relay 41 and 42, and the clutch-members 29 and 31 are meshed by such tilting, the starting into rotation of the pinion 28 causes a similar starting of the gear 45 and cam 46, so that the notch 47, which is deep enough to do it, depresses the cam-button 49 to produce engagement of the contact members 50 and 51; which engagement continues until the notch 47 again registers with the cam-button 49, so that the circuit of the electromagnet 35 is maintained until such registry occurs, even though in the meantime the relay 41 or 42 which has caused such energization ceases to maintain it by reason of the termination of the emergency.

Thus with either the mechanical arrangement of Fig. 1 or the electrical arrangement of Fig. 2, the high-speed movement of the chart continues after the termination of the emergency sufficiently long to produce a predetermined total high-speed movement of the chart, or some multiple thereof. For instance, if the gearing 25, 28, and 45 is so proportioned that the came 46 makes one complete rotation for a travel distance of the chart 10 equal to one day's normal travel of the chart, as is a very desirable proportioning, the high-speed movement of the chart continues after the termination of the emergency for a period sufficiently long to bring the pen 13 to the same hour and minute on the chart that is occupied at the time the emergency started, though one or more days later on the chart; so that after the emergency the meter will resume its normal slow-speed recording operation at a chart-indication corresponding to the actual time of day, and the normal record may be obtained from the chart with the proper hour and minute indications by merely skipping that part of the chart which has made the high-speed record of the emergency. The change from high-speed to slow-speed movement of the chart occurs when the notch 47 comes into registry with the stop 48 or cam-button 49.

The ratio between the high-speed and the low-speed movement of the chart may be made anything desired, by suitably proportioning the gearing and suitably choosing the speed of the motor 32. One desirable relation of speeds is with the high-speed motion 3600 times as fast as the low-speed motion; so that the chart will travel the same distance in a second at the high speed as it does in an hour at the low speed. With this arrangement, the hour-lines 12 on the chart become indications of seconds during the emergency. If 3600 is too fast or too slow for the ratio of high speed to low speed, other desirable relations are some multiples or aliquots of 3600, such as 7200, 1800, or 900. These relations, however, are merely desirable relations, and are not essential.

The operation of the device as a whole is clear: So long as there is no emergency, the chart 10 is driven at slow speed, by the clock-work mechanism 20 acting through the over-running clutch 22—23. During this normal slow-speed operation, the shaft 29 and gears 25, 28, and 45 are all at rest, and the overrunning clutch 26—27 merely permits the shaft 15 to turn; but the motor 32 and the worm or clutch-member 31 are in continuous operation at the desired speed, in readiness to produce the high-speed operation immediately when the emergency arises, so that upon the occurrence of the emergency no time will be lost for a period of acceleration of the motor 32 and the normal running parts associated therewith. These normal running parts, including the motor 32, have a relatively high moment of inertia as compared with the gears 25, 28, and 45, the cam 46, the shaft 15, the chart 10, and the various parts moving with the shaft 15 and the chart 10.

When the emergency arises, such as an overload to produce the closing of the relay 41, or a failure of voltage to produce a closing of the relay 42, the electromagnet 35 is immediately energized; and at once tilts the frame 30 to shift the clutch-member 39 into engagement with the moving clutch-member 31. This engagement of the two clutch-members at once starts the gear 25 into motion, and the overrunning clutch 26—27 at once begins to drive the shaft 15 and the chart 10 at high speed, while the overrunning clutch 22—23 merely serves to permit the overrunning of the shaft 15. In other words, the high-speed drive takes the driving of the chart 10 away from the low speed drive. By reason of having the motor 32 and the clutch-member 31 in continuous rotation, it becomes possible to start the high-speed drive of the chart much more promptly after the start of the emergency than is otherwise possible, and in practice I actually get the high-speed drive fully started within not to exceed one-twenty-fifth (1/25th) of a second; whereas in an arrangement which requires a normally stationary high-speed driving motor to start up after the emergency begins there is so much loss in a period of acceleration that the chart does not reach the high-speed condition for a much longer time than that, and throughout that period of acceleration is operating at a constantly changing speed which loses the record or destroys the value of the record during the most important part of the emergency, when it is most desirable to have the detail record exact and complete.

The emergency usually lasts only a few seconds. With a ratio between the high speed and the low speed of 3600, an emergency lasting not more than twenty-four (24) seconds (as is ordinarily the case) would result in the opening of the emergency relay 41 or 42 before the chart 10 has traveled at the high speed a distance equal to a normal slow-speed indication of twenty-four (24) hours; but by reason of the cam 46 and stop 48, or of the cam 46 and cam-button 49 and the associated contact members 50 and 51, the high-speed motion is continued sufficiently long to obtain a travel of the chart equal to a normal slow-speed indication of twenty-four (24) hours. If with the aforesaid ratio of 3600, the emergency lasts longer than twenty-four (24) seconds, (as sometimes occurs,) nevertheless when the emergency ceases the cam 46 and its associated parts insure the continued operation of the chart at the high speed until the chart has returned to the same hour and minute as at the start of the emergency; though with a plurality of normal days intervening on the chart.

I have described my invention in connection with an electric meter, but that is merely by way of example; for my invention is applicable to graphic meters of any sort.

I claim as my invention:—

1. In a graphic meter, the combination of a chart, a marking device for the chart, a low-speed driving mechanism for normally driving the chart, a high-speed driving mechanism for driving the chart at a higher speed, said high-speed driving mechanism being normally ineffective to drive the chart, means controlled by the occurrence of an emergency for making said high-speed driving mechanism effective to drive the chart, and means operative upon the cessation of the emergency for maintaining the high-speed driving mechanism effective to drive the chart until the total movement of the chart at the high speed has reached a predetermined distance.

2. In a graphic meter, the combination of a chart, a marking device for the chart, a low-speed driving mechanism for normally driving the chart, a high-speed driving mechanism for driving the chart at a higher speed, said high-speed driving mechanism being normally ineffective to drive the chart, and means controlled by the occurrence of an emergency for making said high-speed driving mechanism effective to drive the chart, said high-speed driving mechanism including a continuously moving driving device.

3. In a graphic meter, the combination of a chart, a marking device for the chart, low-speed and high-speed driving devices for driving the chart, connections from each of said driving devices to the chart for driving the latter, each of said connections including an overrunning clutch, the connection from said high-speed driving device to said chart also including a normally open clutch, and said high-speed driving device being continuously in motion but ineffective to drive the chart because of said open clutch, and means for closing said normally open clutch upon the occurrence of an emergency.

4. In a graphic meter, the combination of a chart, a marking device for the chart, low-speed and high-speed driving devices for driving the chart, connections from each of said driving devices to the chart for driving the latter, each of said connections including an overrunning clutch, the connection from said high-speed driving device to said chart also including a normally open clutch, and said high-speed driving device being continuously in motion but ineffective to drive the chart because of said open clutch, means for closing said normally open clutch upon the occurrence of an emergency, and means for maintaining said normally open clutch closed after the cessation of the emergency until the total movement of the chart at high speed has reached a predetermined distance.

5. In a graphic meter, the combination of a chart, a marking device for the chart, low-speed and high-speed driving devices for driving the chart, connections from each of said driving devices to the chart for driving the latter, the connection from the low-speed driving mechanism to the chart including an overrunning clutch, the connection from said high-speed driving device to said chart including a normally open clutch, and said high-speed driving device being continuously in motion but ineffective to drive the chart because of said open clutch, and means for closing said normally open clutch upon the occurrence of an emergency.

6. In a graphic meter, the combination of a chart, a marking device for the chart, low-speed and high-speed driving devices for driving the chart, connections from each of said driving devices to the chart for driving the latter, the connection from the low-speed driving mechanism to the chart including an overrunning clutch, the connection from said high-speed driving device to said chart including a normally open clutch, and said high-speed driving device being continuously in motion but ineffective to drive the chart because of said open clutch, means for closing said normally open clutch upon the occurrence of an emergency, and means for maintaining said normally open clutch closed after the cessation of the emergency until the total movement of the chart at high speed has reached a predetermined distance.

7. In a graphic meter, the combination of a chart, a marking device for the chart, low-speed and high-speed driving devices for driving the chart, connections from each of said driving devices to the chart for driving the latter, each of said connections including an overrunning clutch, means for rendering the high-speed driving device effective to drive the chart upon the occurrence of an emergency, and means for maintaining the high-speed driving device effective to drive the chart after the cessation of the emergency until the chart has moved a predetermined distance.

8. In a graphic meter, the combination of a chart, a marking device for the chart, low-speed and high-speed driving devices for driving the chart, connections from each of said driving devices to the chart for driving the latter, the connection from the low-speed driving mechanism to the chart including an overrunning clutch, means for rendering the high-speed device effective to drive the chart upon the occurrence of an emergency, and means for maintaining the high-speed driving device effective to drive the chart after the cessation of the emergency until the chart has moved a predetermined distance.

In witness whereof, I have hereunto set my hand at Indianapolis, Indiana, this 16th day of January, A. D. one thousand nine hundred and twenty-five.

DONALD J. ANGUS.